United States Patent
Uemura et al.

(10) Patent No.: US 8,559,203 B2
(45) Date of Patent: Oct. 15, 2013

(54) POWER SOURCE APPARATUS WITH HARMONIC SUPPRESSION

(75) Inventors: Masaya Uemura, Tokyo (JP); Tsutomu Fukuda, Kanagawa (JP); Yasushi Katayama, Kanagawa (JP)

(73) Assignee: Sony Corporation, Tokyo (JP)

( * ) Notice: Subject to any disclaimer, the term of this patent is extended or adjusted under 35 U.S.C. 154(b) by 290 days.

(21) Appl. No.: 12/662,596

(22) Filed: Apr. 26, 2010

(65) Prior Publication Data

US 2010/0302808 A1 Dec. 2, 2010

(30) Foreign Application Priority Data

May 29, 2009 (JP) ................................. 2009-130003

(51) Int. Cl.
*H02M 5/42* (2006.01)

(52) U.S. Cl.
USPC ............. 363/89; 323/222; 363/126; 363/127

(58) Field of Classification Search
USPC ............... 323/207, 222; 363/34, 89, 123–127
See application file for complete search history.

(56) References Cited

U.S. PATENT DOCUMENTS

| | | | | |
|---|---|---|---|---|
| 7,688,608 B2* | 3/2010 | Oettinger et al. | ............ | 363/132 |
| 8,085,563 B2* | 12/2011 | Gaboury et al. | ............... | 363/89 |
| 2005/0018458 A1* | 1/2005 | Shimada et al. | ............. | 363/125 |
| 2006/0170288 A1* | 8/2006 | Usui | .............................. | 307/17 |
| 2008/0232141 A1* | 9/2008 | Artusi et al. | ............. | 363/21.01 |

* cited by examiner

*Primary Examiner* — Monica Lewis
*Assistant Examiner* — Lakaisha Jackson
(74) *Attorney, Agent, or Firm* — Rader, Fishman & Grauer PLLC (57) ABSTRACT

A power source apparatus includes: a first alternating current line; a second alternating current line; an electric power inputting portion including a rectifying circuit for rectifying an alternating current voltage supplied from an alternating current power source, the electric power inputting portion serving to output the rectified voltage to each of the first and second alternating current lines; a first converter including a switching element for converting the alternating current voltage into a first direct current voltage; a second converter for converting the first direct current voltage obtained in the first converter into a second direct current voltage; and a control circuit for carrying out control for driving at least the switching element of the first converter so as to be turned ON or OFF.

12 Claims, 4 Drawing Sheets

POWER SOURCE APPARATUS WITH HARMONIC SUPPRESSION

BACKGROUND OF THE INVENTION

1. Field of the Invention

The present invention relates to a power source apparatus for rectifying an A.C. (Alternating Current) voltage supplied from an A.C. power source to generate a stable D.C. (Direct Current) voltage, and more particularly to a power source apparatus including a PFC (Power Factor Correction) control circuit.

2. Description of the Related Art

In a power source apparatus including a PFC converter using a PFC control IC, the generation of a higher harmonic can be suppressed by improving a power factor thereof.

SUMMARY OF THE INVENTION

Now, in this sort of power source apparatus, it is necessary that a PFC converter operates in a phase of activation of a power source, and an output voltage is boosted up to a predetermined voltage. At this time, however, a large current is generated in a path because an output capacitor having a large capacitance is charged with the electricity, and thus a boosting operation is carried out for the output voltage while an over-current protecting circuit works.

When the over-current protecting circuit works, a switching element of the PFC converter carries out a switching operation for a period of time shorter than a regulated ON-time.

As a result, a switching frequency becomes high, and thus the switching operation is carried out at a high switching frequency and the large current is caused to flow through a choke coil, whereby a so-called busy sound is generated from the choke coil.

In addition, not only in a phase of activation of the power source apparatus, but also in a phase of abnormality such as instantaneous stop of an A.C. power source, the same busy sound is generated from the choke coil even when the PFC output voltage reduced is boosted again.

A power source apparatus is known which takes such measures that a soft-start terminal is provided in an IC for control to limit an electric power in the phase of the activation of the power source apparatus, or a resistor for limiting a current is inserted into an A.C. power source input line and is disconnected from the A.C. power source input line after completion of the activation by a relay circuit or the like as measures taken to prevent the generation of the busy sound from the choke coil.

However, this power source apparatus involves problems such as an increase in the number of terminals in the control IC, and an increase in the number of external parts or components. In addition, the measures described above are those taken only in the phase of the activation of the power source apparatus, and thus do not contribute to the prevention of the generation of the busy sound in the phase of the instantaneous stop of the A.C. power source.

The present invention has been made in order to solve the problems described above, and it is therefore desirable to provide a power source apparatus which is capable of preventing generation of a busy sound caused by over-current control carried out in a phase of activation of the power source apparatus, or in a phase of return from instantaneous stop of an A.C. power source while an increase in the number of terminals, and an increase in the number of external parts or components are suppressed.

In order to attain the desire described above, according to an embodiment of the present invention, there is provided a power source apparatus including: a first alternating current line; a second alternating current line; an electric power inputting portion including a rectifying circuit for rectifying an alternating current voltage supplied from an alternating current power source, the electric power inputting portion serving to output the rectified voltage to each of the first and second alternating current lines; a first converter including a switching element for converting the alternating current voltage into a first direct current voltage; a second converter for converting the first direct current voltage obtained in the first converter into a second direct current voltage; and a control circuit for carrying out control for driving at least the switching element of the first converter so as to be turned ON or OFF. The first converter includes: an output node; a choke coil disposed in the first alternating current line, one end of the choke coil being connected to an output terminal of the rectifying circuit; a diode connected between the other end of the choke coil and the output node so that a forward direction is obtained from the other end side of the choke coil toward the output node; the switching element connected between the first alternating current line on the other end side of the choke coil, and the second alternating current line; and an output capacitor connected between the output node and the second alternating current line. The control circuit controls an ON-time for the switching element in accordance with at least an output voltage from the first converter of the output voltage from the first converter, and an activation state of the second converter.

As set forth hereinabove, according to the present invention, it is possible to provide the power source apparatus which is capable of preventing the generation of the busy sound caused by the over-current control carried out in the phase of the activation of the power source apparatus, or in the phase of the return from instantaneous stop of the A.C. power source while the increase in the number of terminals, and the increase in the number of external parts or components are suppressed.

DETAILED DESCRIPTION OF THE PREFERRED EMBODIMENTS

The preferred embodiments of the present invention will be described in detail hereinafter with reference to the accompanying drawings.

It is noted that the description will be given below in accordance with the following order.

1. Outline of Entire Configuration of Power Source Apparatus
2. Operation of Power Source Apparatus
3. Change of Embodiment <1. Outline of Entire Configuration of Power Source Apparatus>

Figure 1:
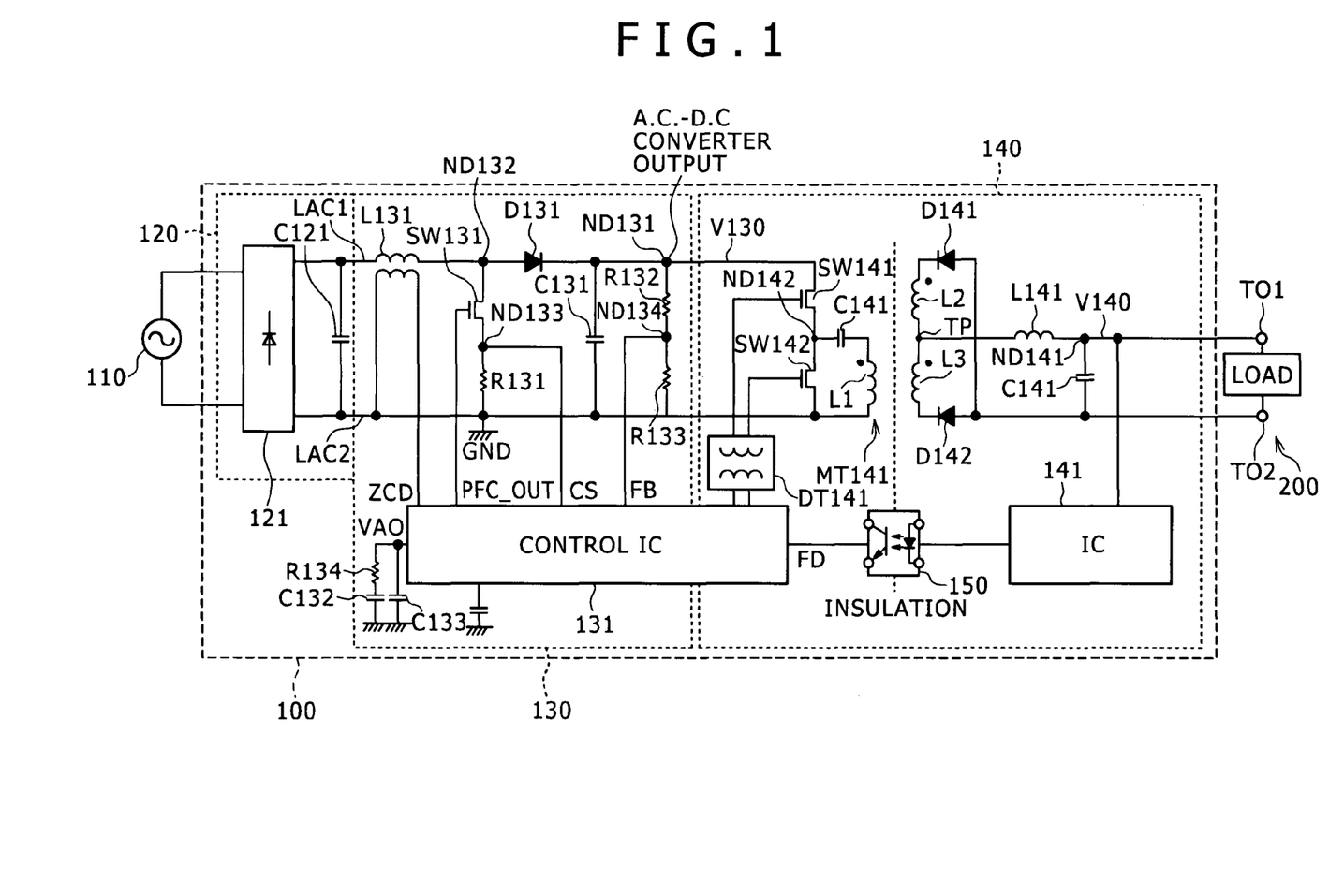
FIG. 1 is a circuit diagram, partly in block, showing an outline of an entire configuration of a power source apparatus, used for an electronic apparatus to which an electric power is supplied from an A.C. power source, according to an embodiment of the present invention.

FIG. 1 is a circuit diagram, partly in block, showing a configuration of a power source apparatus, for an electric apparatus to which an electric power is supplied from an A.C. power source, according to an embodiment of the present invention.

The power source apparatus 100 according to the embodiment of the present invention is used in the electronic apparatus 200 to which an electric power is supplied from an A.C. power source such as a home socket (commercial power source).

A game console or a television receiver, for example, corresponds to the electronic apparatus 200.

The power source apparatus 100 includes an A.C. power source 110, an electric power inputting portion 120, an A.C.-D.C. converter 130 as a first comparator, a D.C.-D.C. converter 140 as a second comparator, and a photocoupler 150.

The electric power inputting portion 120 includes a rectifying circuit 121 and an input capacitor C121.

The input capacitor C121 is connected between a first A.C. line LAC1 and a second A.C. line LAC2 on an output side of the rectifying circuit 121.

In the electric power inputting portion 120, an A.C. voltage supplied from the A.C. power source 110 is rectified by the rectifying circuit 121, and the resulting voltage is outputted across the first A.C. line LAC1 and the second A.C. line LAC2.

A PFC converter is generally applied to the A.C.-D.C. converter 130.

The A.C.-D.C. converter 130 includes a choke coil L131, a switching element SW131, a current detecting resistor R131, a diode D131, and an output capacitor C131.

The A.C.-D.C. converter 130 includes output voltage detecting resistors R132 and R133 serving as an output voltage detecting portion, and a control circuit (a semiconductor integrated circuit, i.e., a control IC) 131.

In addition, the A.C.-D.C. converter 130 includes an external resistor R134 for phase compensation, and external capacitors C132 and C133 which are all connected to a terminal VAO of the control IC 131.

The A.C.-D.C. converter 130 includes nodes ND131 to ND134.

The node ND131 forms an output node of a conversion voltage V130 obtained in the A.C.-D.C. converter 130.

The choke coil L131 is connected between the A.C. lines LAC1 and LAC2 which are connected between output terminals of the rectifying circuit 121. One end of the choke coil L131 is connected to a terminal ZCD of the control IC 131.

The switching element SW131 is composed of an re-channel insulated gate field effect transistor (an FET, i.e., an NMOS transistor).

An anode of the diode D131 is connected to one end of the choke coil L131 on the first A.C. line LAC1 side, and a connection point between the one end of the choke coil L131 and the anode of the diode D131 forms a node ND132.

A cathode of the diode D131 is connected to a node ND131.

A drain of the switching element SW131 is connected to the first A.C. line LAC1, a source of the switching element SW131 is connected to one end of the current detecting resistor R131, and a connection point between the source of the switching element SW131 and the one end of the current detecting resistor R131 forms a node ND133.

A gate as a control terminal of the switching element SW131 is connected to a terminal PFC_OUT of the control IC 131.

The other end of the current detecting resistor R131 is connected to the second A.C. line LAC2, and the second A.C. line LAC2 is connected to the ground GND.

In addition, the node ND133 is connected to a terminal CS of the control IC 131.

The switching element SW131 is controlled so as to be turned ON or OFF by the control IC 131.

The current detecting resistor R131 detects a current being caused to flow through the switching element SW131.

One end of the output capacitor C131 is connected to the cathode side (the node ND131) of the diode D131, and the other end of the output capacitor C131 is connected to the second A.C. line LAC2.

The output voltage detecting resistors R132 and R133 are connected in series between the node ND131 in the first A.C. line LAC1, and the second A.C. line LAC2.

A connection point between the output voltage detecting resistors R132 and R133 forms the node ND134.

The node ND134 is connected to a terminal FB of the control IC 131.

The control IC 131 is configured so as to be adapted to control (limit) an ON-time of the switching element SW131 in accordance with the output voltage V130 from the A.C.-D.C. converter 130, and an activation state of the D.C.-D.C. converter 140.

The control IC 131 has an output terminal PFC_OUT. In this case, a switching signal SSW in accordance with which the switching element SW131 can be periodically turned ON or OFF is outputted to the gate serving as the control terminal of the switching element SW131 through the output terminal PFC_OUT of the control IC 131.

The control IC 131 has the input terminal FB, for the output voltage, connected to a node ND134 at which the output voltage V130 developed at the node ND131 as an output terminal of the A.C.-D.C. converter 130 can be detected.

The control IC 131 has the output terminal VAO through which a voltage corresponding to the voltage developed at the input terminal FB can be outputted.

The control IC 131 has a function of determining the ON-time of the switching signal SSW which is outputted through the output terminal PFC_OUT in accordance with a voltage developed at an output terminal VAO.

The control IC 131 has the input terminal CS. In this case, a voltage developed at the node ND133 connected to the current detecting resistor R131 for detecting the current being caused to flow through the switching, element SW131 is inputted to the control IC 131 through the input terminal CS.

The control IC 131 has a function of capable of turning OFF the switching element SW131 as soon as the control IC 131 detects that the voltage developed at the input terminal CS has reached a predetermined voltage.

The control IC has a terminal FD. In this case, a feedback signal of the output voltage from the D.C.-D.C. converter 140 is inputted to the terminal FD of the control IC 131 through the photocoupler 150.

The control IC 131 has a function of limiting the voltage developed at the output terminal VAO in accordance with the output voltage V130 from the A.C.-D.C. converter 130, and the activation state of the D.C.-D.C. converter 140.

The control IC 131 controls the voltage developed at the output terminal VAO in accordance with a diode clamp system.

Also, the control IC 131 has two or more clamp voltages.

The control IC 131 has a function of carrying out not only control for the switching element SW131 of the A.C.-D.C. converter 130, but also drive control for the D.C.-D.C. converter 140.

That is to say, the feature of the power source apparatus 100 of the embodiment is that the control for the A.C.-D.C. converter 130, and the control for the D.C.-D.C. converter 140 are carried out by the same control IC 131.

Figure 2:
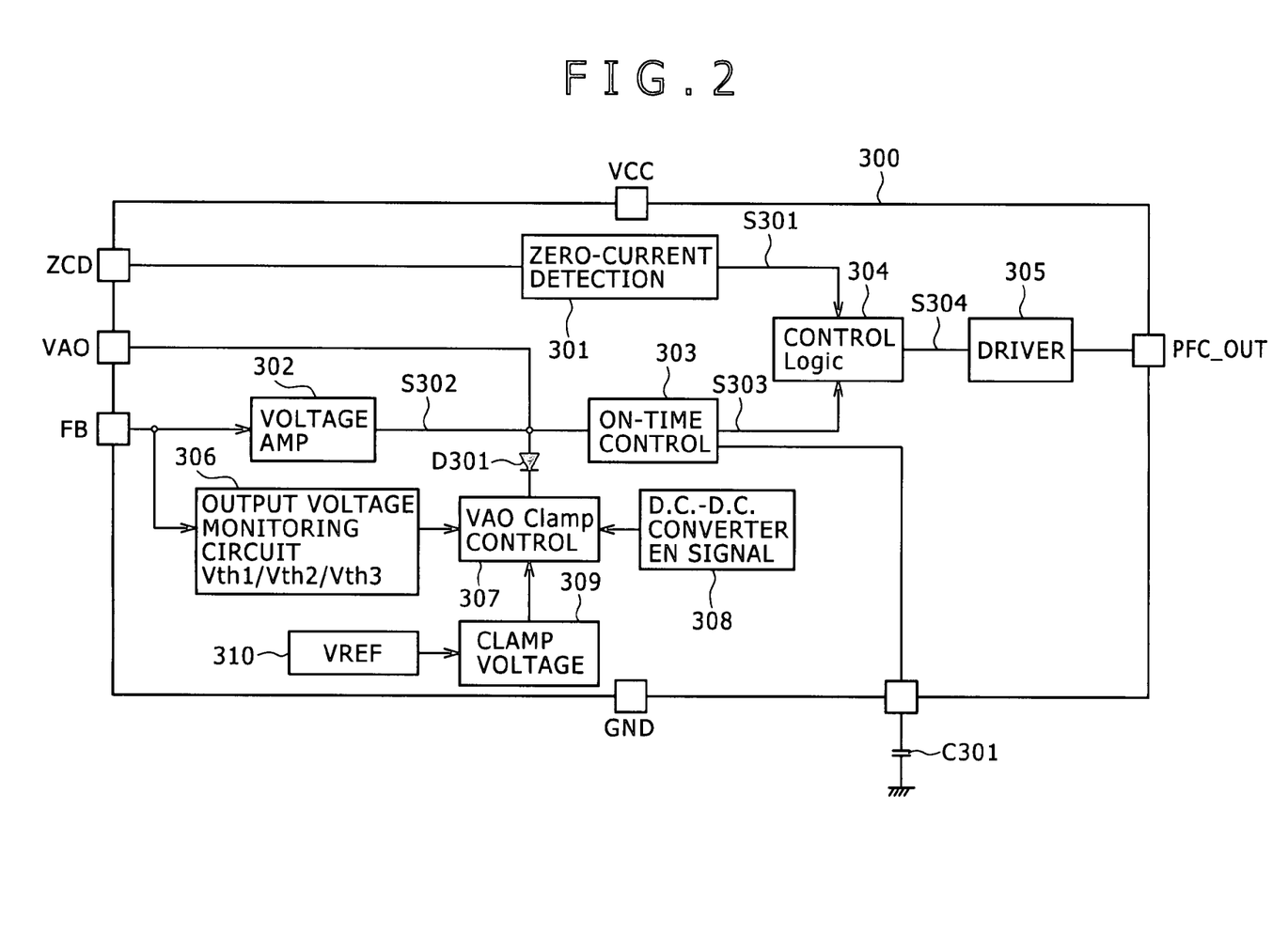
FIG. 2 is a block diagram showing a configuration of a control system for the switching element of the control circuit in the power source apparatus according to the embodiment of the present invention.

FIG. 2 is a block diagram showing a configuration of a control system for the switching element of the control IC (control circuit) in the power source apparatus according to the embodiment of the present invention.

The control system 300 for the switching element SW131 in the control IC 131 shown in FIG. 2 includes a zero-current detecting circuit 301, a voltage amplifier 302 serving as a voltage inputting portion, an ON-time controlling portion 303, a control logic 304, and a driver 305.

The control system 300 includes an output voltage monitoring circuit 306, a voltage (VAO) clamp control circuit 307, a D.C.-D.C. converter enable (EN) signal creating portion 308, a clamp voltage supplying portion 309, and an IC internal reference voltage (VREF) supplying portion 310.

Also, the control system 300 includes a diode D301 and an external capacitor C301.

The zero-current detecting circuit 301 detects that no current has been caused to flow through the choke coil L131 through the terminal ZCD, and supplies the detection result as a zero detection signal S301 to the control logic 304.

The voltage amplifier 302 amplifies the output voltage V130 inputted thereto from the A.C.-D.C. converter 130 through the terminal FB, and supplies the output voltage V130 thus amplified to the ON-time controlling portion 303.

The ON-time controlling portion 303 determines the ON-time for the switching element SW131 in accordance with an output signal 5302 from the voltage amplifier 302, and outputs the determination result as a signal S303 to the control logic 304.

In response to the zero detection signal 5301, the control logic 304 creates a signal 5304 in accordance with which the switching element SW131 is held in an ON state for a period of time specified by the signal 5303, and outputs the signal 5304 thus created to the driver 305.

The driver 305 outputs the signal 5304 inputted thereto as a switching signal SSW to a gate serving as a control terminal of the switching element SW131 through the output terminal PFC_OUT.

The output voltage monitoring circuit 306 monitors an operation state of the power source apparatus 100 in two or more stages in accordance with the output voltage V130 inputted thereto from the A.C.-D.C. converter 130 through the terminal FB, and outputs the monitoring result to the VAO clamp controlling circuit 307.

The output voltage monitoring circuit 306 monitors the operation state of the power source apparatus 100 by, for example, using three threshold voltages Vth1, Vth2 and Vth3 (Vth2>Vth1>Vth3).

In response to both the monitoring results obtained in the output voltage monitoring circuit 306, and an enable signal EN obtained in the D.C.-D.C. converter enable (EN) signal creating portion 308, the VAO clamp controlling circuit 307 arbitrarily controls the output voltage from the voltage amplifier 302 as a clamp voltage in two or more stages.

When detecting the activation state of the D.C.-D.C. converter 140, the D.C.-D.C. converter enable (EN) signal creating portion 308 creates an enable signal EN, and supplies the enable signal EN thus created to the VAO clamp controlling circuit 307.

A signal in accordance with which the activation state of the D.C.-D.C. converter 140 is to be detected is created based on an internal signal in the case of a monolithic IC. However, this signal is created based on a signal inputted from the outside in the case where the control IC for the PFC converter, and the D.C.-D.C. converter control signal are separated from each other.

The clamp voltage supplying portion 310 creates a clamp voltage based on a reference voltage VREF of the IC internal reference voltage supplying portion 310, and supplies the clamp voltage thus created to the VAO clamp controlling circuit 307.

As a result, the arbitrary voltage setting can be carried out.

Although a clamp system using a diode is generally utilized as the voltage clamp system, the system for clamping is no object. There is no limitation to the number of voltages which are set in accordance with the power source apparatus used, and the switching of the load situation.

With the power source apparatus 100, the A.C. voltage supplied from the A.C. power source 110 is converted into an output voltage V130, from the A.C.-D.C. converter 140, as a first D.C. voltage of about 400 V by the A.C.-D.C. converter 130.

The output voltage V130 is further converted into a second D.C. voltage V140, for example, 12 V which is required for the electronic apparatus 200 by the insulated. D.C.-D.C. converter 140 to be distributed to the electronic apparatus 200.

The insulated D.C.-D.C. converter 140 includes a main transformer MT141, switching elements SW141 and SW142, a capacitor C141, and a drive transformer DT141 on a primary side thereof.

In addition, the insulated D.C.-D.C. converter 140 includes diodes D141 and D142, a choke coil L141, a capacitor C142, and a feedback circuit (IC) 141 on a secondary side thereof.

The insulated D.C.-D.C. converter 140 includes an output node ND141, and output terminals TO1 and TO2 on the secondary side thereof.

Each of the switching elements SW141 and SW142 is composed of an n-channel insulated gate field effect transistor (an FET, i.e., an NMOS transistor).

A drain of the switching element SW141 is connected to the output node ND131 (the first A.C. line LAC1) of the A.C.-D.C. converter 130, a source of the switching element SW141 is connected to a drain of the switching element SW142, and a connection point between the source of the switching element SW141 and the drain of the switching element SW142 forms a node ND142.

A source of the switching element SW141 is connected to the second A.C. line LAC2.

Each of gates, of the switching elements SW141 and SW142, serving as control terminals is connected to a drive line of the drive transformer DT141.

The main transformer MT141 includes a primary coil L1 on a primary side thereof. One end (dot terminal) of the primary coil L1 is connected to the node ND142 through the capacitor C141, and the other end (non-dot terminal) of the primary coil L1 is connected to the second A.C. line LAC2.

The main transformer MT141 includes a first secondary coil L2 and a second secondary coil L3 which are connected to each other so as to obtain a forward polarity through a tap TP mutually electromagnetically coupled to the primary coil L1.

It should be noted that in FIG. 2, the relative polarities of the coils L1 to L3 are shown in the form of dots, respectively, so as to follow the standard notation.

Also, the forward polarity stated herein means that a non-dot terminal, having no dot, of the first secondary coil L2, and a dot terminal, having a dot, of the second secondary coil L3 are each connected to the tap TP.

A cathode of the diode D141 is connected to the other end (dot terminal) of the first secondary coil L12, and an anode of the diode D141 is connected to an anode of the diode D142 and the output terminal TO2.

A cathode of the diode D142 is connected to the other end (non-dot terminal) of the second secondary coil L3.

One end of the choke coil L141 is connected to the tap TP, and the other end of the choke coil L141 is connected to the output terminal TO1 to which the output node ND 141 is connected.

Also, the capacitor C142 is connected between the output terminals TO1 and TO2.

The feedback circuit 141 outputs an output voltage from the output node ND141, for example, a divided voltage as a feedback signal to the photocoupler 150.

The photocoupler 150 converts the feedback signal inputted thereto into an optical signal, and then converts the optical signal into an electrical signal which is in turn supplied to the terminal FD of the control IC 131.

It should be noted that the configuration of the D.C.-D.C. converter 140 is by no means limited to the configuration described above, and thus various kinds of forms can be applied to the configuration of the D.C.-D.C. converter 140.

<2. Operation of Power Source Apparatus>

Next, an operation of the power source apparatus 100 having the configuration described above will be described.

In the following, an outline of the entire system, a cause of generation of the busy sound, and a control operation for preventing the generation of the busy sound will be described in order with reference to FIGS. 3 to 5.

In the following, the description will be given with the A.C.-D.C. converter 130 as the PFC converter.

Figure 3:
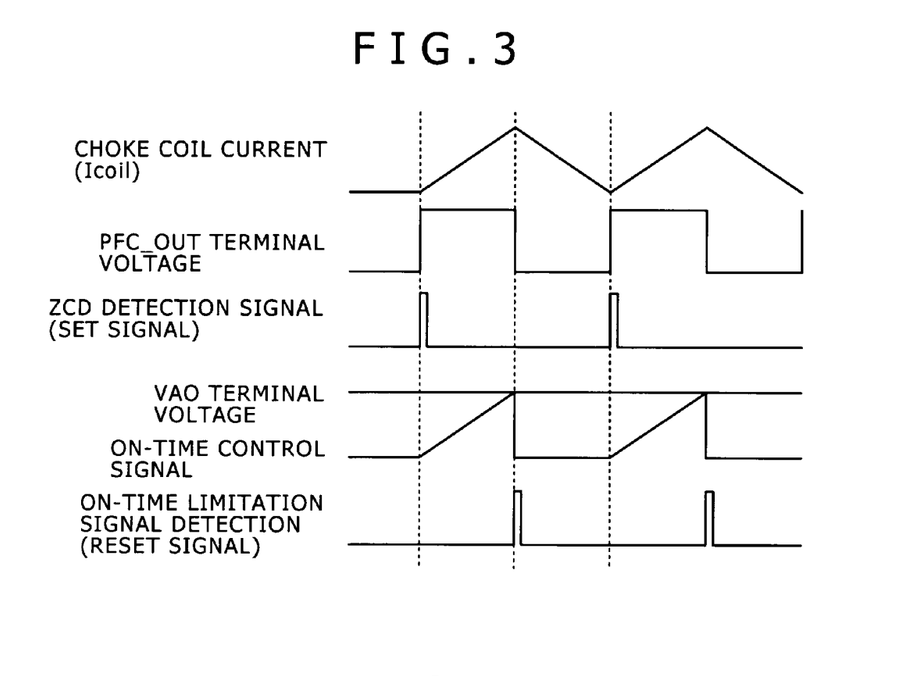
FIG. 3 is a timing chart explaining an operation of a critical-mode PFC converter.

FIG. 3 is a timing chart explaining an operation of a critical-mode PFC converter.

Figure 4:
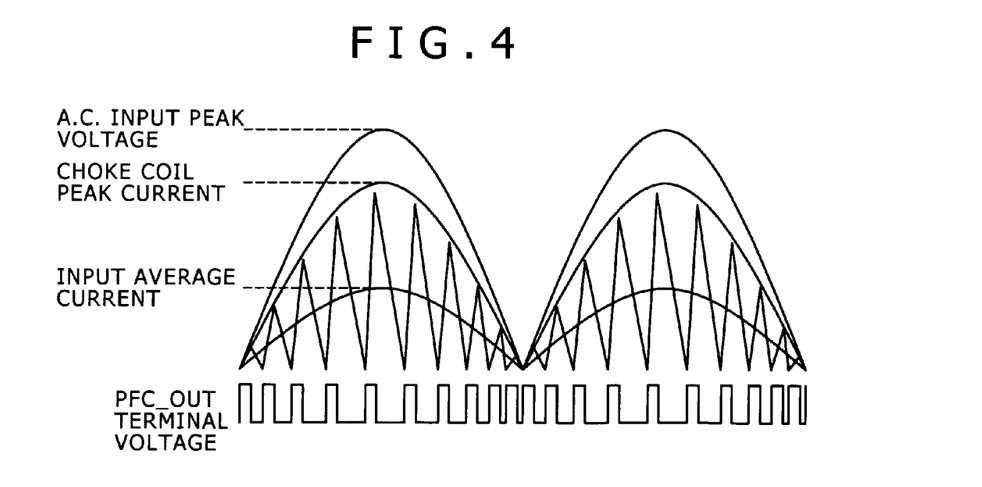
FIG. 4 is a chart showing waveforms of currents in the critical-mode PFC converter shown in FIG. 3.

FIG. 4 is a chart showing waveforms of currents in the critical-mode PFC converter.

Figure 5:
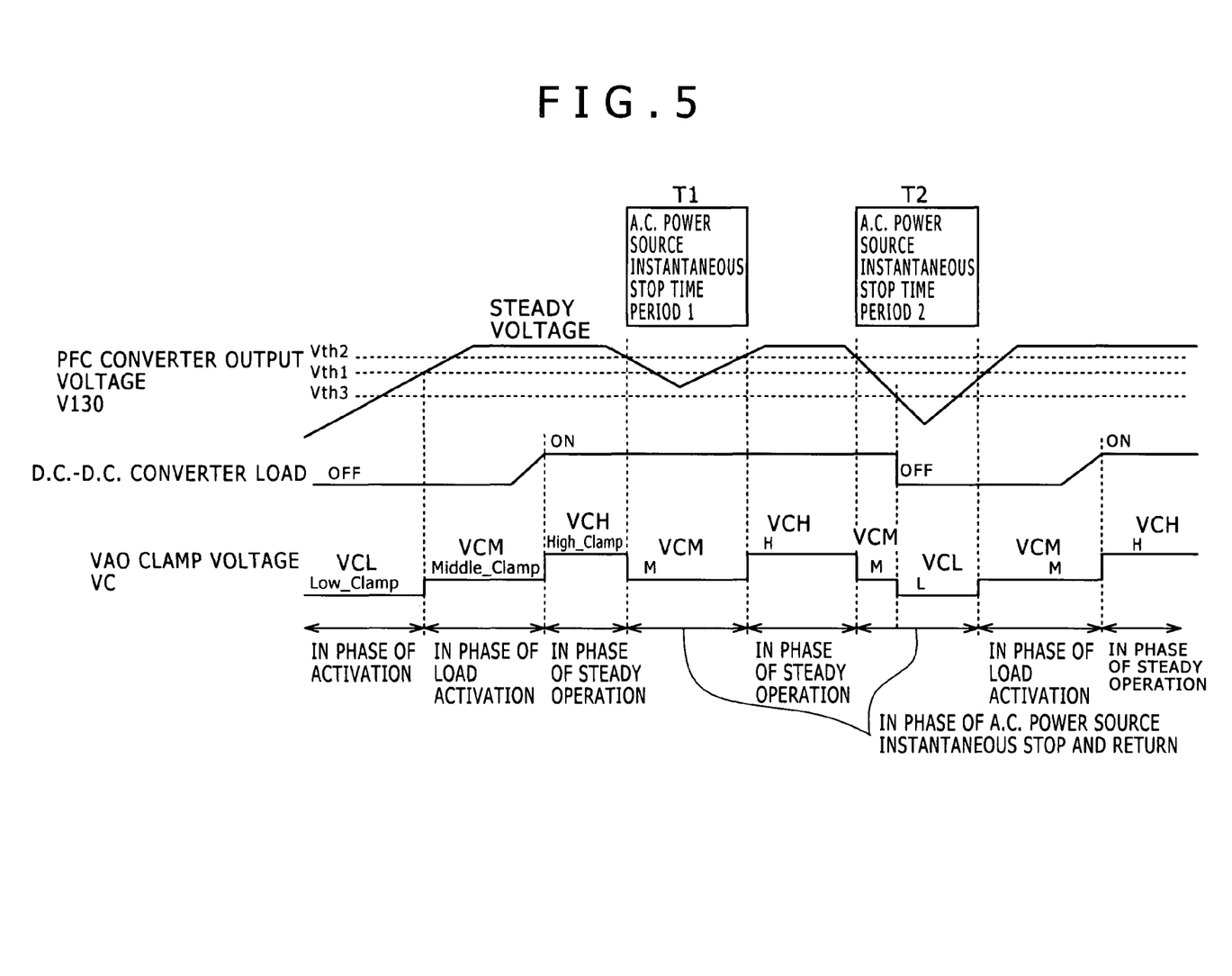
FIG. 5 is a timing chart explaining an operation of the power source apparatus according to the embodiment of the present invention.

FIG. 5 is a timing chart explaining an operation of the power source apparatus according to the embodiment of the present invention.

[Outline of Operation of Entire System]

A signal supplied from the A.C. power source 110 is converted into the output voltage V130, as a D.C. voltage of about 400 V, of the A.C.-D.C. converter 130 by the A.C.-D.C. converter 130.

Also, the output voltage V130 from the A.C.-D.C. converter 130 is then converted into the voltage required for the electronic apparatus 200 by the insulated D.C.-D.C. converter 140 to be distributed to the electronic apparatus 200.

As previously stated, the PFC converter is generally used as the A.C.-D.C. converter 130. The PFC converter is controlled by the control IC 131.

Hereinafter, the operation of the critical-mode PFC converter will be described in relation to FIG. 3.

[Operation of Critical-Mode PFC Converter]

When the switching element SW131 is turned ON by the control IC 131, the current is caused to flow into the ground GND through both the choke coil L131 and the switching element SW131.

After a lapse of a period of time determined by the control IC 131, the switching element SW131 is turned OFF. When the switching element SW131 is turned OFF, the energy accumulated in the choke coil L131 is supplied to the output node ND131 through the diode D131.

The control IC 131 detects that the current being caused to flow through the choke coil L131 has become zero, and then turns ON the switching element SW131.

The ON-time of the switching element SW131 is controlled by the control IC 131 in accordance with the output voltage V130.

In a state in which the output voltage V130 is lower than a predetermined voltage, the ON-time is prolonged for boosting. On the other hand, in a state in which the output voltage V130 is higher than the predetermined voltage, the switching-OFF period of time continues.

In the operation described above, the current is caused to flow through the choke coil L131 in proportion to an instantaneous voltage of the input voltage obtained through the full-wave rectification in the rectifying current 121. As a result, it is possible to improve a power factor (refer to FIG. 4).

A current Icoil caused to flow through the choke coil L131 is expressed in a phase of an ON state or an OFF state of the switching element SW131 by Expressions (1) and (2):

$$Icoil = Vac/L \text{(in phase of ON state)}. \tag{1}$$

where Vac represents an A.C. input voltage (instantaneous voltage), and L represents an inductance of the coil L131.

$$Icoil = (Vout - Vac)/L. \tag{2}$$

where Vout represents the output voltage from the PFC converter.

[Description about Busy Sound of Choke Coil]

Next, a description will be given with respect to the busy sound generated in the choke coil of the PFC converter (A.C.-D.C. converter).

When the output voltage from the PFC converter is low in the phase of the activation of the PFC converter, the voltage developed at the terminal VAO rises so as to boost the output voltage from the PFC converter, and thus the long ON-time for the switching element SW131 is set.

When the ON-time for the switching element SW131 becomes long, the current caused to flow through the switching element SW131 via the choke coil L131 becomes large in proportion to the long ON-time for the switching element SW131. Thus, when the voltage developed across the opposite terminals of the current detecting resistor R131 has reached an over-current detection threshold voltage, the switching element SW131 is immediately turned OFF.

At this time, when the switching operation of the switching element SW131 is repeatedly carried out with a shorter period than a predetermined ON-time, and the large current being generated in the path vibrates the choke coil L131, so that the vibration is generated with an audible period, the vibration is observed in the form of a busy sound from the choke coil L131.

This busy sound is also generated in a phase of return after the output voltage from the PFC converter has been stopped such as when the A.C. power source 110 has been instantaneously stopped.

This busy sound is required to be reduced for the power source for the game console or the digital home electrical appliance (TV), and thus the measures using the external parts or components have been mainly taken to cope with the generation of the busy sound until now.

With the control system adopting the power source apparatus 100 according to the embodiment of the present invention, the ON-time for the switching element is limited in the phase of the activation of the PFC converter or in the phase of the instantaneous stop of the A.C. power source 110. As a result, the current being caused to flow through the choke coil L131 is limited, thereby making it possible to prevent the busy sound from being generated in advance.

[Control for PFC Converter in Embodiment]

In the power source apparatus 100, as shown in FIG. 2, the switching element SW131 is turned ON in accordance with the input signal inputted from the terminal ZCD through which it is detected that no current has been caused to flow through the choke coil L131 of the PFC converter.

In response to the output voltage V130 inputted from the terminal FB through which the output voltage from the PFC converter is to be inputted, the ON-time is determined in accordance with the output signal from the voltage amplifier 302.

The output signal from the voltage amplifier 302 is clamped to an arbitrary voltage by the VAO clamp controlling circuit 307 in accordance with the state of the power source.

The clamp voltage is controlled in the voltages in two or more stages in accordance with the voltage developed at the terminal FB through which the output voltage from the PFC converter is monitored, and the signal in accordance with which the activation state of the D.C.-D.C. converter 140 is detected.

As previously stated, the signal in accordance with which the activation state of the D.C.-D.C. converter 140 is detected is created based on the internal signal in the case of the monolithic IC. However, that signal is created based on the signal inputted from the outside in the case where the control IC 131 of the PFC converter, and the control signal for the D.C.-D.C. converter 140 are separated from each other.

The clamp voltage is created based on the IC internal reference voltage (VREF), thereby making it possible to arbitrarily set the clamp voltage.

Although the clamp system using a diode is generally utilized as the voltage clamp system, the system for clamping is no object. There is no limitation to the number of voltages which are set in accordance with the power source apparatus used, and the switching of the load situation.

[Power Source Sequence in Embodiment]

A power source sequence of the power source apparatus 100 according to the embodiment of the present invention will now be described with reference to FIG. 5. FIG. 5 shows the case where the clamp voltage is set in three stages.

In the phase of the activation of the PFC converter, in a stage in which the output voltage from the PFC converter is low, the VAO clamp voltage VC is set at a Low clamp voltage VCL.

When the output voltage from the PFC converter rises, so that the output voltage V130 inputted through the terminal FB exceeds a threshold set voltage Vth1, the VAO clamp voltage VC is switched from the Low clamp voltage VCL over to a Middle clamp voltage VCM. As a result, it is possible to suppress the reduction of the output voltage following an increase in the load 200 due to the activation of the D.C.-D.C. converter 140.

After that, it is detected that the D.C.-D.C. converter 140 has been activated, and thus the VAO clamp voltage VC is switched from the Middle clamp voltage VCM over to a High clamp voltage VCH so that the power source apparatus 100 can withstand a maximum load of the D.C.-D.C. converter 140.

In the normal PFC converter, the ON-time is set so that the PFC converter can operate even in the case of the maximum load of the D.C.-D.C. converter 140 from the phase of the activation. As a result, the large current is generated in the choke coil L131 in the phase of the activation, which causes the busy sound to be generated in the choke coil L131.

In addition, FIG. 5 shows the sequence in the phase of the instantaneous stop of the A.C. power source 110, and a description thereof will be given below.

The A.C. power source 110 is instantaneously stopped, and an A.C. power source instantaneous stop time period T1 for which the output voltage V130 from the PFC converter is reduced is detected, and it is also detected that the input voltage V130 inputted through the terminal FB falls below the set voltage Vth2. As a result, the VAO clamp voltage VC is switched from the High clamp voltage VCH over to the Middle clamp voltage VCM.

When the instantaneous stop is released in the A.C. power source 110, the output voltage V130 from the PFC converter is boosted up to the predetermined voltage again. However, since the VAO clamp voltage VC is set at the Middle clamp voltage VCM, the ON-time in the phase of the boosting is also limited, and the current being caused to flow through the choke coil L131 is suppressed, thereby making it possible to prevent the busy sound from being generated in the choke coil L131.

When for an A.C. power source instantaneous stop time period T2 for which the instantaneous stop time of the A.C. power source 110 is set long, the output voltage V130 from the PFC converter falls below a set voltage Vth3 for regulation of the stop of the D.C.-D.C. converter 140, the sequence in this case becomes identical to the sequence in the phase of the activation of the PFC converter.

In general, the set voltage Vth1 in accordance with which the D.C.-D.C. converter 140 is activated is higher than the set voltage Vth3 in accordance with which the D.C.-D.C. converter 140 is stopped, and thus the hysteresis is provided. As a result, the clamp voltage VC can be arbitrarily set in accordance with the activation situation of the D.C.-D.C. converter 140.

In the embodiment, the High clamp voltage VCH is set at 3.2 V, the Middle clamp voltage VCM is set at 1.6 V, and the Low clamp voltage VCL is set at 1.3 V.

However, these clamp voltages VCH, VCM and VCL are switched in accordance with the use form of the power source equipment. In addition, the switching timing of the VAO clamp voltage VC is arbitrarily controlled by an internal timer.

<3. Change of Embodiment>

Hereinafter, changes of the power source apparatus of the embodiment will be described.

It is no object that the control circuits for the PFC converter and the D.C.-D.C. converter are either the integrated control circuit or the separate control circuits.

The set number of voltage amplifier clamp voltage is no object as long as it is equal to or larger than two.

The set number of monitoring voltages for the terminal FB for the switching of the VAO clamp voltage is no object as long as it is equal to or larger than one.

The timing at which the VAO clamp voltage is switched over to another one does not depend on not only the time right after detection of the monitor voltage for the terminal FB or detection of the activation of the D.C.-D.C. converter, but also the timer setting in the inside of the IC as long as it is set after the detection of the monitor voltage for the terminal FB or after the detection of the activation of the D.C.-D.C. converter.

Not only the critical mode control, but also a current continues mode, a current discontinuous mode or the like are available in form for the PFC converter, and thus the form of the PFC converter is no object.

The present invention is applied for the purpose of preventing not only the generation of the busy sound in the choke coil, but also the generation of the busy sound in any other passive element with which the power source apparatus is equipped.

As set forth hereinabove, according to the embodiment of the present invention, it is possible to prevent the busy sound from being generated in the choke coil due to the over-current control in the phase of the activation of the PFC converter or in the phase of the return from the A.C. power source instantaneous stop.

As a result, it is possible to reduce the number of external parts or components provided to cope with the busy sound problem, and it is also possible to enhance the power source quality.

The present application contains subject matter related to that disclosed in Japanese Priority Patent Application JP 2009-130003 filed in the Japan Patent Office on May 29, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A power source apparatus, comprising:
 a first alternating current line;
 a second alternating current line;
 an electric power inputting portion including a rectifying circuit for rectifying an alternating current voltage supplied from an alternating current power source, said electric power inputting portion serving to output the rectified voltage to each of said first and second alternating current lines;
 a first converter including a switching element for converting the alternating current voltage into a first direct current voltage;
 a second converter for converting the first direct current voltage obtained in said first converter into a second direct current voltage; and
 a control circuit for carrying out control for driving at least said switching element of said first converter so as to be turned ON or OFF,
 said first converter including
 an output node,
 a choke coil having a first choke coil winding part and a second choke coil winding part operably associated with the first choke coil winding part, said first choke coil winding part disposed in said first alternating current line, one end of said first choke coil winding part being connected to an output terminal of said rectifying circuit, the second choke coil winding part connected at one end thereof to said second alternating current line and an opposing end thereof to said control circuit,
 a diode connected between an opposing end of said first choke coil winding part and said output node so that a forward direction is obtained from the other end side of said choke coil toward said output node,
 said switching element connected between said first alternating current line on the other end side of said choke coil, and said second alternating current line, and
 an output capacitor connected between said output node and said second alternating current line, wherein
 said control circuit controls an ON-time for said switching element in accordance with at least an output voltage from said first converter, and an activation state of said second converter, wherein
 when detecting that no current is caused to flow through said choke coil, said control circuit turns ON said switching element, and determines the ON-time for said switching element in accordance with the output voltage from said first converter and wherein
 said control circuit includes:
 a voltage inputting portion configured to receive the output voltage from said first converter;
 an ON-time controlling portion configured to determine the ON-time for said switching element in accordance with a level of an output signal from said voltage inputting portion;
 a monitoring circuit for monitoring the level of the output signal from said voltage inputting portion in a plurality of stages; and
 a clamp controlling circuit for clamping the output signal from said voltage inputting portion in accordance with a monitoring result obtained in said monitoring circuit.

2. The power source apparatus according to claim 1, wherein
 when detecting that no current is caused to flow through said choke coil, said control circuit turns ON said switching element, and determines the ON-time for said switching element in accordance with the output voltage from said first converter.

3. The power source apparatus according to claim 1, wherein
 said control circuit is adapted to carry out conversion control for said first converter, and conversion control for said second converter.

4. The power source apparatus according to claim 1, wherein
 said clamp controlling circuit clamps the output signal from said voltage inputting portion so that the output voltage from said voltage inputting portion becomes a low voltage as the output voltage becomes lower, and clamps the output signal from said voltage inputting portion so that the output voltage from said voltage inputting portion becomes a high voltage as the output voltage becomes higher.

5. The power source apparatus according to claim 4, wherein
 said clamp controlling circuit clamps the output signal from said voltage inputting portion in two or more stages in accordance with at least the monitoring result obtained in said monitoring circuit, and a signal in accordance with which the activation state of said second converter is detected.

6. The power source apparatus according to claim 1, wherein said control circuit is adapted to output a clamp voltage through an output terminal.

7. The power source apparatus according to claim 1, wherein said control circuit controls a clamp voltage in accordance with a diode clamp system.

8. The power source apparatus according to claim 1, wherein said control circuit has a function of periodically turning ON or OFF said switching element.

9. The power source apparatus according to claim 1, wherein said control circuit has a function of turning OFF said switching element as soon as detecting that a detection level of a current being caused to flow through said switching element reaches a predetermined level.

10. A power source apparatus, comprising:
a first alternating current line;
a second alternating current line;
an electric power inputting portion including a rectifying circuit for rectifying an alternating current voltage supplied from an alternating current power source, said electric power inputting portion serving to output the rectified voltage to each of said first and second alternating current lines;
a first converter including a switching element for converting the alternating current voltage into a first direct current voltage;
a second converter for converting the first direct current voltage obtained in said first converter into a second direct current voltage; and
a control circuit for carrying out control for driving at least said switching element of said first converter so as to be turned ON or OFF,
said first converter including
  an output node,
  a choke coil disposed in said first alternating current line, one end of said choke coil being connected to an output terminal of said rectifying circuit,
  a diode connected between an opposing end of said choke coil and said output node so that a forward direction is obtained from the other end side of said choke coil toward said output node,
  said switching element connected between said first alternating current line on the other end side of said choke coil, and said second alternating current line, and
  an output capacitor connected between said output node and said second alternating current line, wherein
said control circuit controls an ON-time for said switching element in accordance with at least an output voltage from said first converter, and an activation state of said second converter,
  wherein
  when detecting that no current is caused to flow through said choke coil, said control circuit turns ON said switching element, and determines the ON-time for said switching element in accordance with the output voltage from said first converter and
  said control circuit includes:
    a voltage inputting portion configured to receive the output voltage from said first converter;
    an ON-time controlling portion configured to determine the ON-time for said switching element in accordance with a level of an output signal from said voltage inputting portion;
    a monitoring circuit for monitoring the level of the output signal from said voltage inputting portion in a plurality of stages; and
    a clamp controlling circuit for clamping the output signal from said voltage inputting portion in accordance with a monitoring result obtained in said monitoring circuit.

11. The power source apparatus according to claim 10, wherein
said clamp controlling circuit clamps the output signal from said voltage inputting portion so that the output voltage from said voltage inputting portion becomes a low voltage as the output voltage becomes lower, and clamps the output signal from said voltage inputting portion so that the output voltage from said voltage inputting portion becomes a high voltage as the output voltage becomes higher.

12. The power source apparatus according to claim 11, wherein
said clamp controlling circuit clamps the output signal from said voltage inputting portion in two or more stages in accordance with at least the monitoring result obtained in said monitoring circuit, and a signal in accordance with which the activation state of said second converter is detected.

* * * * *